United States Patent
Woo et al.

(10) Patent No.: US 9,298,475 B2
(45) Date of Patent: Mar. 29, 2016

(54) METHOD AND APPARATUS FOR CONSTRUCTING A WIDGET ENVIRONMENT

(75) Inventors: Hong-Uk Woo, Seoul (KR);
Soon-Hwan Kwon, Seongnam-si (KR);
Sung-Jin Park, Yongin-si (KR); Yun-Je Oh, Seongnam-si (KR); Dong-Jun Kum, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 70 days.

(21) Appl. No.: 13/235,255

(22) Filed: Sep. 16, 2011

(65) Prior Publication Data
US 2012/0072926 A1 Mar. 22, 2012

(30) Foreign Application Priority Data
Sep. 17, 2010 (KR) .................. 10-2010-0091959

(51) Int. Cl.
| G06F 3/00 | (2006.01) |
| G06F 9/44 | (2006.01) |
| G06F 9/46 | (2006.01) |
| G06F 13/00 | (2006.01) |
| G06F 9/54 | (2006.01) |
| H04N 21/443 | (2011.01) |

(52) U.S. Cl.
CPC ............. *G06F 9/4443* (2013.01); *G06F 9/541* (2013.01); *H04N 21/4431* (2013.01)

(58) Field of Classification Search
None
See application file for complete search history.

(56) References Cited

U.S. PATENT DOCUMENTS

| 7,366,752 | B2 * | 4/2008 | Stawikowski et al. | 709/202 |
| 7,930,702 | B2 * | 4/2011 | Xie et al. | 719/315 |
| 2005/0273781 | A1 * | 12/2005 | Nakamura et al. | 717/178 |
| 2007/0173266 | A1 * | 7/2007 | Barnes, Jr. | 455/456.1 |
| 2008/0222238 | A1 * | 9/2008 | Ivanov et al. | 709/202 |
| 2010/0161978 | A1 * | 6/2010 | Bacher | 713/166 |
| 2010/0223385 | A1 * | 9/2010 | Gulley et al. | 709/226 |

OTHER PUBLICATIONS

T. Berners-Lee, R. Fielding and H. Frystyk, "Hypertext Transfer Protocol—HTTP/1.0 (RFC1945)", May 1, 1996, retrieved from http://ip.com/pdf/ipcompad/IPCOM000004247D.pdf on Nov. 21, 2012, pp. 1-51.*

E. Michael Maximilien, Ajith Ranabahu and Karthik Gomadam, "An Online Platform for Web APIs and Service Mashups", 2008, IEEE Internet Computing 1089-7801/08, retrieved from http://ieeexplore.ieee.org/stamp/stamp.jsp?tp=&arnumber=4620092 on Nov. 21, 2012, pp. 32-43.*

"OMTP BONDI 1.0 Approved Release" May 28, 2009, retrieved from http://www.omtp.org/1.0/index.htm on Nov. 21, 2012, 2 pages.*

* cited by examiner

*Primary Examiner* — H S Sough
*Assistant Examiner* — William C Wood

(57) ABSTRACT

A method and apparatus construct a widget environment. The method converts an application programming interface (API) into an API call in a Web service format in response to identifying that the API that is not executable in a current device is called. The method transmits the API call in the Web service format to a remote device in which the API is executable. The method receives a result obtained from the API call being executed in the Web service format in the remote device.

20 Claims, 4 Drawing Sheets

FIG. 2

```
Bondi.geolocation.getCurrentPosition(
        function(position) {
                alert("latitude: " + position.coords.latitude);
        }
)
```

FIG. 3

```
var Bondi;
Bondi = {
geolocation : {
   getCurrentPosition : function (callback) {
     xmlHttpReq.onreadystatechange = callback;
     var URL = getDeviceUrl() + 'api/geolocation/location.json';
     xmlHttpReq.open('GET', URL, true);
   }
}
}
```

FIG. 4

```
GET /api/geolocation/location.json HTTP/1.1
Host: johnMobile.Bondira.com
```

FIG. 5

```
public abstract class GeoServlet extends HttpServlet
{
    public void getlocation(HttpServletRequest req,
                            HttpServletResponse res){
        android.location.Location loc = new ...;
        loc.getLatitude();
        :
    }
}
```

FIG. 6

```
HTTP/1.1 200 OK
...
"location" : { "timestamp" : 1229072400000,"coords" :
{"latitude":0,"longitude":0,"altitudue":0,"accuracy":2,"altitudeAccuracy":40,"heading":90,
"speed":10}}
```

FIG. 7

```
function(position) {
    alert("latitude: " + position.coords.latitude);
}
```

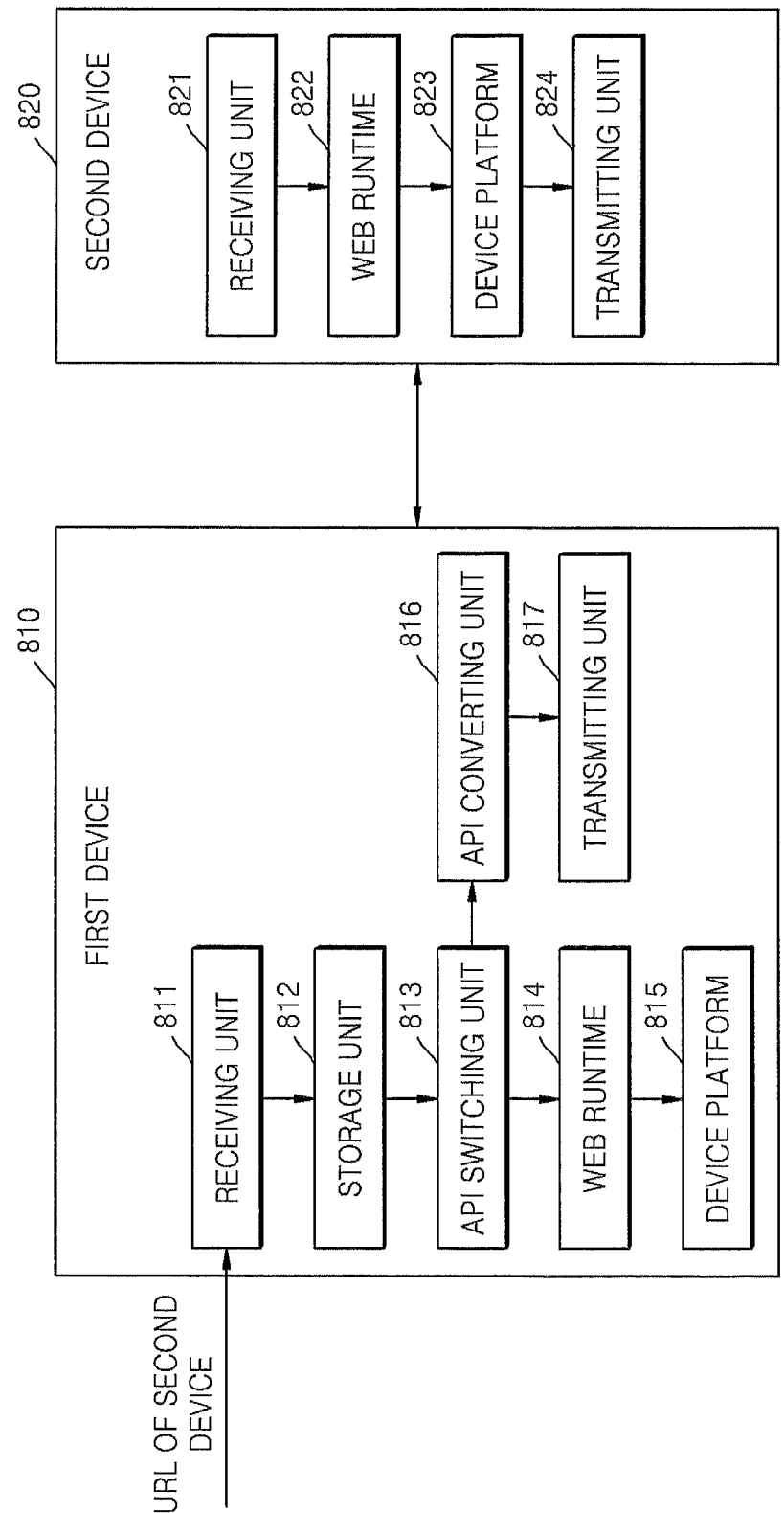

METHOD AND APPARATUS FOR CONSTRUCTING A WIDGET ENVIRONMENT

CROSS-REFERENCE TO RELATED APPLICATION(S) AND CLAIM OF PRIORITY

The present application is related to and claims priority to Korean Patent Application No. 10-2010-0091959, filed on Sep. 17, 2010, in the Korean Intellectual Property Office, the disclosure of which is incorporated herein in its entirety by reference.

TECHNICAL FIELD OF THE INVENTION

The present invention relates generally to a method and apparatus for constructing a widget environment, and more particularly to, a method and apparatus for constructing a widget environment by transmitting an application programming interface (API) that is not executed in a current device to a remote device and receiving a result of an executed API.

BACKGROUND OF THE INVENTION

An open mobile terminal platform (OMTP) is a form launched by mobile communication providers for the purpose of a growth of a user-oriented mobile service and data business. OMTP Bondi is the standard device API specification in Javascript. Major carriers want to have a cross mobile platform solution (write-once run-anywhere) based on web/widget technologies. This goal is same with W3C DAP (Device APIs and Policy group). There are a couple of well know industry cross platform solutions for mobile devices such as Phonegap and Rhomobile. These solutions are not yet compatible to Bondi and hardly expected to become soon due to their major target platform in the mobile application market, Apple iPhone. OMTP has released v1.1 specification and Window mobile reference implementation by the first quarter in 2010. Bondi is considered a major candidate platform for WAC (wholesale application community) of which alliance plan has been announced in MWC 2010 by major carriers and device vendors including AT&T, China Mobile, Orange, Softbank, Vodafone, KT, Telefonica, Verizon Wireless, Samsung, LG, and Sonic Ericsson.

OMTP Bondi aims at offering a set of common APIs to application developers such that they are not required to learn and use different APIs for accessing the same capability on different mobile devices and platforms. In general, web applications are device- and platform-independent but even web applications should use specific methods inherently dependent to a platform for accessing the internal resources and functionalities on devices. Bondi provides the standard interface to device internal resources, so Bondi applications could be run on any target devices without source code modification.

BONDI has exceeded the limit of a simple network application in a web runtime and approaches resources inside a phone based on standards, and thus mobile applications can be developed irrespective of operating systems (OSs) and platforms. Owing to these attributes, BONDI is expected to grow as a next-generation standard mobile development platform.

Although an application open market recently initiated by manufacturers is dependent on OSs or platforms, since a web runtime follows a web standard and is independent on platforms, BONDI will be an important selection in an application open market led by mobile communication providers strategically.

However, BONDI provides a standard interface accessible to internal device resources according to a device API specification of BONDI, whereas BONDI does not provide an interface that accesses to remote resources and calls a remote procedure call.

SUMMARY OF THE INVENTION

To address the above-discussed deficiencies of the prior art, it is a primary object to provide a method and apparatus for constructing a widget environment that, when an application programming interface (API) is not executed in a current device, transmits the API to a remote device in which the API is executed, and receives a result of the executed API, and uses remote resources.

According to an aspect of the present disclosure, there is provided a method of constructing a widget environment. The method converts an application programming interface (API) into an API call in a Web service format in response to identifying that the API that is not executable in a current device is called. The method transmits the API call in the Web service format to a remote device in which the API is executable. The method receives a result obtained from the API call being executed in the Web service format in the remote device.

The method may further include calling the API; and determining whether the API is executable in the current device.

The determining of whether the API is executable in the current device may include comparing the API with a function of a Web runtime included in the current device and determining whether the API is executable in the current device.

The method may further include if it is determined that the API is executable in the current device, executing the API in the current device.

The method may further include receiving an address of the remote device in which the API is executable, wherein the transmitting of the API call in the Web service format to the remote device in which the API is executable may include transmitting the API call in the Web service format to the remote device according to the address of the remote device.

The address of the remote device may be a uniform resource locator (URL).

The transmitting of the API call in the Web service format to the remote device in which the API is executable may include transmitting the API call in the Web service format to the remote device in which the API is executable in a HTTP request format.

The receiving of the result obtained by executing the API call in the Web service format in the remote device may include receiving the result obtained by executing the API call in the Web service format in the remote device in a HTTP response format.

The method may further include converting the result obtained by executing the API call in the Web service format into a result obtained by executing the called API.

The API call in the Web service format may be a representational state transfer (REST) API call.

The API may be a Bondi API.

According to another aspect of the present disclosure, there is provided an apparatus for constructing a widget environment. An API converting unit is configured to convert the API into an API call in a Web service format in response to identifying that an API that is not executable in the apparatus for constructing the widget environment is called. A transmitting unit configured to transmit the API call in the Web service format to a remote device in which the API is executable. A receiving unit configured to receive a result obtained from the API call being executed in the Web service format in the remote device.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 is a diagram of an application programming interface (API) according to an embodiment of the present disclosure;

FIG. 3 is a diagram of a Bondi API call into a representational state transfer (REST) API call according to an embodiment of the present disclosure;

FIG. 4 is a diagram of a transmission of a representational state transfer (REST) API call to a second device in a HTTP request format according to an embodiment of the present disclosure;

FIG. 5 is a diagram of an execution of a REST API call in a HTTP request format by using a corresponding device API call in a second device according to an embodiment of the present disclosure;

FIG. 6 is a diagram of transmitting a result obtained by executing a REST API call in a HTTP response format to a first device in a second device according to an embodiment of the present disclosure;

FIG. 7 is a diagram of calling a HTTP Response as a callback function when the HTTP Response is received according to an embodiment of the present disclosure; and FIG. 8 is a block diagram of a system for constructing a widget environment according to an embodiment of the present disclosure.

DETAILED DESCRIPTION OF THE INVENTION

Figure 1:
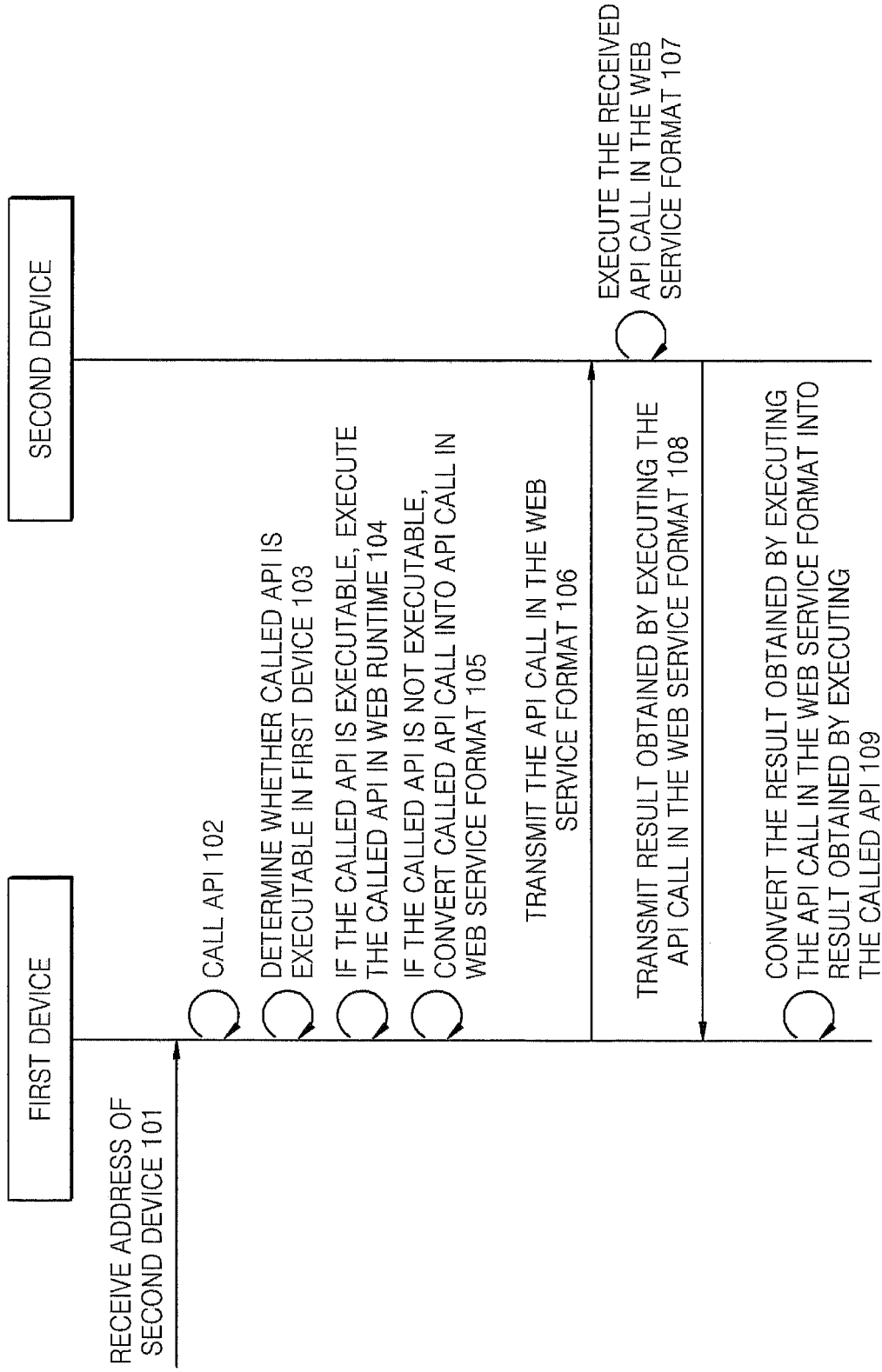
FIG. 1 is a flowchart of a method of constructing a widget environment, according to an embodiment of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged. Hereinafter, the present invention will be described in detail by explaining embodiments of the invention with reference to the attached drawings.

FIG. 1 is a flowchart of a method of constructing a widget environment, according to an embodiment of the present disclosure.

Referring to FIG. 1, in operation 101, a user transmits an address of a second device to a first device. In this example, the second device is located remotely from the first device. The first device receives and stores the address of the second device. The second device denotes a remote device in which a specific application programming interface (API) is executable. The address means a device uniform resource locator (URL) of the remote second device. For example, the device URL of the remote second device may be "John.Bondira.com/mobile." An operation of setting the device URL of the second device in the first device is performed when the device URL of the second device is initially registered or corrected.

In operation 102, the first device calls the API. An application for executing the specific API may need to be previously downloaded and installed in the first device. When the first device drives the application, the application calls the specific API. For example, to use a Bondi API, a Bondi application may need to be previously downloaded and installed. The Bondi application is installed and executed in a device as a web application prepared in HyperText Mark Up Language/Cascading Style Sheets/JavaScript (HTML/CSS/Javascript), and uses the Bondi API to use a device function for a runtime. According to an embodiment of the present disclosure, an example of the Bondi API prepared in HTML/CSS/Javascript of the Bondi application is illustrated in FIG. 2. Referring to FIG. 2, the first device calls the Bondi API "Bondi.geolocation.getCurrentPosition" based on an external input. The example of the Bondi API illustrated in FIG. 2 is an API that obtains latitude position information in a coordinate system.

In operation 103, the first device determines whether the called API is executable in the first device. The first device compares the called API with a Web runtime function included in the first device and determines whether the called API is executable in the first device. The Web runtime means a software environment in which a Web application is executed, and enables the use of a partial function of a device. In the Bondi application, the Web runtime means a software environment in which HTML/CSS/Javascript is executed, and enables the use of a partial function of the device as HTML/CSS/Javascript. For example, if the called API is the Bondi API, the first device compares the Bondi API called in the Bondi application with a function of the Web runtime and determines whether the called Bondi API is executable in the first device.

In operation 104, if the called API is executable in the first device, the first device executes the called API in the Web runtime of the first device.

In operation 105, if the called API is not executable in the first device, the first device converts a called API call into an API call in a Web service format. If the called API is not executable in the first device, the first device searches for a device in which the called API is executable, and selects a URL of the found device. In the present embodiment, an API that is not executable in the first device is assumed to be executable in the second device. Then, the first device converts the called API call into the API call in the Web service format by using a URL of the second device. According to an embodiment of the present disclosure, the first device converts the called API call into a representational state transfer (REST) API call that can be called between Web services by using a remote application. An example of converting the Bondi API call of FIG. 2 into the REST API call is illustrated in FIG. 3. Referring to FIG. 3, the first device obtains the URL of the second device "JohnMobile.Bondira.com" by using a "getDeviceUrl ( )" API function, and converts the Bondi API call "getCurrentPosition" into the REST API call "api/geolocation/location.json".

In operation 106, the first device transmits the API call in the Web service format to the second device. According to an embodiment of the present disclosure, the first device transmits the REST API call to the second device in a HTTP request format by using the URL of the second device. An example of transmitting the REST API call to the second device in the HTTP request format is illustrated in FIG. 4. Referring to FIG. 4, the first device transmits the REST API call "api/geolocation/location.json" to the URL of the second device "JohnMobile.Bondira.com" in the HTTP request format.

In operation 107, the second device executes the received API call in the Web service format. More specifically, the second device transfers the received API call in the Web service format to a corresponding device API call, and executes the corresponding device API call. For example, when the second device receives the REST API call, the second device executes a device API call corresponding to the REST API call. In this example, the second device may need to provide a RESTful device interface. An example of executing the REST API call in the HTTP request format by using the corresponding device API call in the second device is illustrated in FIG. 5.

In operation 108, the second device transmits a result obtained by executing the API call in the Web service format to the first device. The second device transmits the result obtained by executing the API call in a HTTP response format to the first device. The second device formats a result obtained by executing a device API corresponding to a REST API according to a REST API specification, and transmits the result in the HTTP response format to the first device. An example of transmitting the result obtained by executing the REST API call in the HTTP response format to the first device in the second device is illustrated in FIG. 6.

In operation 109, the first device converts the result obtained by executing the API call in the Web service format into a result obtained by executing the called API. For example, the first device changes a format of the result obtained by executing the REST API according to a Bondi API specification and transmits the changed result to the Bondi application. When the HTTP Response of FIG. 2 is received, an example of calling the HTTP Response as a callback function is illustrated in FIG. 7.

With reference to the method of FIG. 1, a television corresponds to the first device in which a video call Bondi application is installed, and a mobile phone corresponds to the second device in which the video call Bondi application is installed. The video call Bondi application may need a camera function, a communication (VoIP) function, and a phonebook function. The television can provide the camera and communication functions, and thus an error occurs when a user performs a video call in the television. In this example, the television converts the video call into a REST call, and transmits the REST call in the HTTP response format to the mobile phone according to a URL of the mobile phone. Thereafter, the REST call is executed in the mobile phone, and a result obtained by executing the REST call is transmitted to the television in the HTTP response format. The television converts the executed REST call into the executed video call and displays an execution result thereon.

According to an embodiment of the present disclosure, devices may access to each other through HTTP request and response. A HTTP request for devices from a browser or a Web service may be made through a service gateway. This process is not provided to users.

A common accessible IP address is not allocated to a device in a network address translation (NAT) gateway that is a network technology used in network equipments such as a router or a firewall or an Internet security product. A common security strategy of mobile operators blocks a HTTP request directly transmitted between devices in a network of mobile operators by using a very strict firewall policy. Therefore, the service gateway is used according to another embodiment of the present disclosure.

The service gateway operates based on a fact that the HTTP request is transmitted from devices in the network of mobile operators through a firewall thereof. Thus, devices of the mobile operators establish channels in the service gateway. In this regard, the service gateway operates as a relay server. That is, a HTTP request from each browser or Web service is transmitted to devices in the HTTP response format. In the present embodiment, the first device transmits the HTTP request to the service gateway, and the service gateway transmits the HTTP response including the HTTP request to the second device, receives the HTTP request to establish tunnels from the second device, and transmits the HTTP response to the first device.

FIG. 8 is a block diagram of a system for constructing a widget environment according to an embodiment of the present disclosure.

Referring to FIG. 8, the system for constructing the widget environment includes a first device 810 and a second device 820. The first device 810 that is an apparatus for constructing the widget environment includes a receiving unit 811, a storage unit 812, an API switching unit 813, a Web runtime 814, a device platform 815, an API converting unit 816, and a transmitting unit 817. The second device 820 includes a receiving unit 821, a Web runtime 822, a device platform 823, and a transmitting unit 824. The first device 810 and the second device 820 are remotely connected to each other over a predetermined communication network. The second device 820 means a remote device in which a specific API that is not executable in the first device 810 is executable.

The receiving unit 811 of the first device 810 receives an address of the second device 820 from a user. The address means a device URL of the second device 820. An operation of setting the device URL of the second device 820 in the first device 810 is performed when the device URL of the second device 820 is initially registered or corrected.

The storage unit 812 of the first device 810 receives and stores the address of the second device 820. An application for executing a specific API is previously downloaded and installed in the storage unit 812 of the first device 810. For example, to sue a Bondi API, a Bondi application may need to be previously downloaded and installed in the storage unit 812 of the first device 810. The Bondi application is a Web application prepared in HTML/CSS/Javascript, installed and executed in a device, and uses the Bond API so as to use a function of the device for a runtime.

The API switching unit 813 determines whether a called API is executable in the first device 810. The API switching unit 813 compares the called API with the Web runtime 814 included in the first device 810 and determines whether the called API is executable in the first device 810. The Web runtime 814 means a software environment in which a Web application is executed, and enables the use of a part of a device function. The Bondi application means a software environment in which HTML/CSS/Javascript is executed, and enables the use of a part of a device function as HTML/Javascript. For example, if the called API is the Bondi API, the API switching unit 813 compares the Bondi API called in the Bondi application with a function of the Web runtime 814 of the first device 810 and determines whether the called Bondi API is executable in the first device 810.

If the called API is executable in the first device 810, the Web runtime 814 of the first device 810 executes the called API by using the device platform 815 of the first device 810.

If the called Bondi API is not executable in the first device 810, the API converting unit 816 converts the called API call into an API call in a Web service format. If the called Bondi API is not executable in the first device 810, the API converting unit 816 searches for a device in which the called API is executable, and selects a URL of the found device. In the present embodiment, the API that is not executable in the first device 810 is assumed to be executable in the second device 820. Thereafter, the API converting unit 816 converts the called API call into an API call in the Web service format by using the URL of the second device 820. According to an embodiment of the present disclosure, the API converting unit 816 converts the called API call into a REST API call that is a standard by which Web services can remotely call applications on Web. If the API converting unit 816 receives a result obtained by executing the API call in the Web service format from the second device 820, the API converting unit 816 converts the API call in the Web service format into a result obtained by executing the called API. For example, the API converting unit 816 changes a format of a result obtained by executing the REST API according to the Bondi API specification, and transmits the changed result to the Bondi application.

The transmitting unit 817 of the first device 810 transmits the API call in the Web service format to the second device 820. According to an embodiment of the present disclosure, the transmitting unit 817 of the first device 810 transmits the REST API call in the HTTP request format to the second device 820 by using the URL of the second device 820.

The Web runtime 822 of the second device 820 executes the API call in the Web service format through the receiving unit 821 of the second device 820. More specifically, the Web runtime 822 of the second device 820 transmits the API call in the Web service format to the corresponding device platform 823 of the second device 820, and executes a corresponding device API call. For example, if the Web runtime 822 of the second device 820 receives the REST API call, the Web runtime 822 of the second device 820 executes a device API call corresponding to the REST PAI call. In this example, the second device 820 may need to provide a RESTful device interface.

The transmitting unit 824 of the second device 820 transmits a result obtained by executing the API call in the Web service format to the first device 810. The transmitting unit 824 of the second device 820 transmits a result obtained by executing the API call in the Web service format to the first device 810 in the HTTP response format. The transmitting unit 824 of the second device 820 formats a result obtained by executing a device API corresponding to the RESET API according to a REST API specification and transmits the formatted result in the HTTP response format to the first device 810.

According to another embodiment of the present disclosure, the first device 810 and the second device 820 may not directly transmit and receive the HTTP request and the HTTP response and transmit and receive the HTTP request and the HTTP response by using a service gateway (not illustrated) as a relay server. The HTTP request for devices from a browser or a Web service may be made through the service gateway. This process is not provided to users.

According to an embodiment of the present disclosure, devices may access to each other through the HTTP request and the HTTP response. However, a common accessible IP address is not allocated to a device in a NAT gateway that is a network technology used in network equipments such as a router or a firewall or an Internet security product. A common security strategy of mobile operators blocks a HTTP request directly transmitted between devices in a network of mobile operators by using a very strict firewall policy. Therefore, the service gateway is used according to another embodiment of the present disclosure.

The service gateway operates based on a fact that the HTTP request is transmitted from devices in the network of mobile operators through a firewall thereof. Thus, devices of the mobile operators establish channels in the service gateway. In this regard, the service gateway operates as a relay server. That is, a HTTP request from each browser or Web service is transmitted to devices in the HTTP response format. In the present embodiment, the first device 810 transmits the HTTP request to the service gateway (not illustrated), and the service gateway (not illustrated) transmits the HTTP response including the HTTP request to the second device 820, receives the HTTP request to establish tunnels from the second device 820, and transmits the HTTP response to the first device 810.

The invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems such that the computer-readable code is stored and executed in a distributed fashion. Also, functional programs, codes, and code segments for accomplishing the present invention can be easily construed by programmers of ordinary skill in the art to which the present invention pertains.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of constructing a widget environment, the method comprising:
   responsive to identifying that an application programming interface (API) that is available but not executable in a current device is called, searching for a remote device in which the API is executable;
   converting the API into an API call in a Web service format using information of the remote device;
   transmitting the API call to the remote device; and
   receiving a result obtained from the API call being executed in the remote device.

2. The method of claim 1 further comprising:
   calling the API; and determining whether the API is executable in the current device.

3. The method of claim 2, wherein determining whether the API is executable in the current device comprises:
comparing the API with a function of a Web runtime included in the current device; and
determining whether the API is executable in the current device.

4. The method of claim 3 further comprising:
responsive to determining that the API is executable in the current device, executing the API in the current device.

5. The method of claim 1 further comprising:
receiving an address of the remote device in which the API is executable; and
wherein transmitting the API call in the Web service format to the remote device in which the API is executable comprises:
transmitting the API call in the Web service format to the remote device according to the address of the remote device.

6. The method of claim 5, wherein the address of the remote device is a uniform resource locator (URL).

7. The method of claim 1, wherein transmitting the API call in the Web service format to the remote device in which the API is executable comprises:
transmitting the API call in the Web service format to the remote device in which the API is executable in a HTTP request format.

8. The method of claim 7, wherein receiving the result obtained from the API call being executed in the Web service format in the remote device comprises:
receiving the result obtained from the API call being executed in the Web service format in the remote device in a HTTP response format.

9. The method of claim 1 further comprising:
converting the result obtained from the API call being executed in the Web service format into a result obtained by executing the API.

10. The method of claim 1, wherein the API call in the Web service format is a representational state transfer (REST) API call.

11. The method of claim 1, wherein the API is a Bondi API.

12. An apparatus for constructing a widget environment, the apparatus comprising:
a controller, comprising hardware, the controller configured to, responsive to identifying that an application programming interface (API) that is available but not executable in the apparatus for constructing the widget environment is called, search for a remote device in which the API is executable, and convert the API into an API call in a Web service format using information of the remote device;
a transmitter configured to transmit the API call to a remote device; and
a receiver configured to receive a result obtained from the API call being executed in the remote device.

13. The apparatus of claim 12, wherein the controller is configured to, responsive to identifying that the API is called, determine whether the API is executable in the apparatus for constructing the widget environment.

14. The apparatus of claim 13, wherein the controller is further configured to compare the API with a function of a Web runtime included in the apparatus for constructing the widget environment and determine whether the API is executable in the apparatus for constructing the widget environment.

15. The apparatus of claim 14, wherein the Web runtime executes the API in response to determining that the API is executable in the apparatus for constructing the widget environment.

16. The apparatus of claim 12, wherein the receiver is further configured to receive a URL of the remote device in which the API is executable and wherein the transmitting unit is further configured to transmit the API call in the Web service format to the remote device according to the URL of the remote device.

17. The apparatus of claim 12, wherein the transmitter is further configured to transmit the API call in the Web service format to the remote device in which the API is executable in a HTTP request format.

18. The apparatus of claim 17, wherein the receiver is further configured to receive the result obtained from the API call being executed in the Web service format in the remote device in a HTTP response format.

19. The apparatus of claim 12, wherein the controller is further configured to convert the result obtained from the API call being executed in the Web service format into a result obtained by executing the called API.

20. The apparatus of claim 12, wherein the API call in the Web service format is a REST API call.

* * * * *